2,931,755
O,O-DIALKYL OR O,O-BIS(HALOALKYL) S-DICHLOROMETHYL PHOSPHOROTHIOATES

Gail H. Birum, Dayton, Ohio, assignor to Monsanto Chemical Company, St. Louis, Mo., a corporation of Delaware No Drawing. Application April 11, 1958
Serial No. 727,770

17 Claims. (Cl. 167—22)

The present invention relates to organophosphorus compounds containing sulfur, and more particularly, provides certain new phosphorothioates, methods of preparing the same, insecticidal and fungicidal compositions comprising said phosphorothioates, and insecticidal and fungicidal methods in which such compositions are used.

According to the invention, there are provided S-dichloromethyl O,O-dialkyl or O,O-bis(haloalkyl) phosphorothioates having the formula

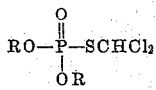

in which R is selected from the class consisting of alkyl and haloalkyl radicals of from 1 to 8 carbon atoms.

I have found that phosphorothioates of the above general formula are readily obtainable by either of two methods. By one procedure I contact an appropriate phosphite with dichloromethanesulfenyl chloride, and the phosphorothioate is formed substantially according to the scheme (I) 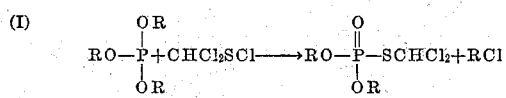

where R is as defined above.

By the other method I contact appropriate dialkyl or bis(haloalkyl) phosphites (sometimes named as dialkyl or bis(haloalkyl) hydrogenphosponates) with thiophosgene in a basic medium and obtain the phosphorothioate substantially according to the following scheme (II) 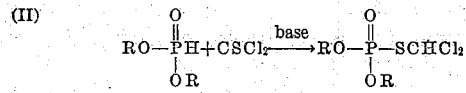

In both of the reaction schemes shown above, R is an alkyl or haloalkyl radical of from 1 to 8 carbon atoms. For the dichloromethanesulfenyl chloride reaction, useful phosphites are, e.g., the simple trialkyl phosphites such as trimethyl, triethyl, tri-n-propyl, triisopropyl, tri-n-butyl, tri-tert-butyl, tri-n-amyl, triisoamyl, tri-n-hexyl, tri-n-heptyl, tris(2-ethylhexyl) and tri-n-octyl phosphites; the mixed trialkyl phosphites such as dimethyl ethyl, di-n-propyl methyl, butyl dimethyl, amyl diethyl, dibutyl n-hexyl, di-n-propyl n-octyl, dimethyl 2-ethylhexyl, ethyl methyl propyl, or amyl n-octyl n-propyl phosphites; the simple tris(haloalkyl) phosphites such as tris(3-chloropropyl), tris(2-chloropropyl), tris(4-bromobutyl), tris-(2,2,2-trichloroethyl), tris(3-iodopropyl), tris(2-fluoroethyl), tris(chlorohexyl), tris(chloroheptyl), or tris-bromooctyl) phosphites; the mixed haloalkyl phosphites such as 2-chloroethyl bis(3-chloropropyl) or 4-bromobutyl bis-(2-chloroethyl) phosphite; and phosphites in which both alkyl and haloalkyl radicals are present such as diethyl 2-chloropropyl phosphite or bis(4-chlorobutyl) propyl phosphite.

Examples of phosphites which are useful in the thio-phosgene (reaction II) above are the simple dialkyl phosphites such as dimethyl, diethyl, di-n-propyl, diisopropyl, di-n-butyl, di-n-amyl, di-tert-amyl, di-n-hexyl, di-n-heptyl, di-n-octyl or bis(2-ethylhexyl) phosphite; the mixed dialkyl phosphites such as amyl ethyl, butyl n-propyl, ethyl n-octyl, isopropyl methyl, ethyl n-hexyl or 2-ethylhexyl methyl phosphite; the simple bis(haloalkyl) phosphites such as bis(2-chloroethyl), bis(2,3-dichloropropyl), bis-(2-iodoethyl), bis(3-chlorobutyl), bis(5-bromoamyl), bis(2-fluoroethyl) and bis(chlorooctyl) phosphite; the mixed haloalkyl haloalkyl phosphites such as 2-chloroethyl 3-chloropropyl or 2-bromoethyl 2-chloropropyl phosphite; and mixed phosphites in which one ester group is derived from an alkanol and the other from a haloalkanol, e.g., amyl 2-chloroethyl or 3-bromopropyl methyl phosphite.

Phosphorothioates provided by the present invention include O,O-dialkyl S-dichloromethyl phosphorothioates in which both alkyl groups are the same, e.g., O,O-dimethyl S-dichloromethyl phosphorothioate
O,O-diethyl S-dichloromethyl phosphorothioate
O,O-di-n-propyl S-dichloromethyl phosphorothioate
O,O-diisopropyl S-dichloromethyl phosphorothioate
O,O-di-n-butyl S-dichloromethyl phosphorothioate
O,O-di-tert-butyl S-dichloromethyl phosphorothioate
O,O-di-n-amyl S-dichloromethyl phosphorothioate
O,O-diisoamyl S-dichloromethyl phosphorothioate
O,O-di-n-hexyl S-dichloromethyl phosphorothioate
O,O-di-n-heptyl S-dichloromethyl phosphorothioate
O,O-di-n-octyl S-dichloromethyl phosphorothioate
O,O-bis(2-ethylhexyl) S-dichloromethyl phosphorothioate The present invention also provides O-alkyl O-haloalkyl S-dichloromethyl phosphorothioates, e.g., O-2-bromoethyl O-methyl S-dichloromethyl phosphorothioate
O-2-chloroethyl O-methyl S-dichloromethyl phosphorothioate
O-amyl O-3-chloropropyl S-dichloromethyl phosphorothioate
O-2-iodoethyl O-n-octyl S-dichloromethyl phosphorothioate
O-ethyl O-2-fluoroethyl S-dichloromethyl phosphorothioate
O-4-chlorobutyl O-2-ethylhexyl S-dichloromethyl phosphorothioate The invention also provides the mixed O,O-dialkyl S-dichloromethyl phosphorothioates such as O-ethyl O-methyl S-dichloromethyl phosphorothioate
O-ethyl O-n-propyl S-dichloromethyl phosphorothioate
O-amyl O-butyl S-dichloromethyl phosphorothioate
O-methyl O-n-octyl S-dichloromethyl phosphorothioate
O-ethyl O-2-ethylhexyl S-dichloromethyl phosphorothioate
O-ethyl O-n-hexyl S-dichloromethyl phosphorothioate The invention also provides O,O-bis(haloalkyl) S-dichloromethyl phosphorothioates such as O,O-bis(2-chloroethyl) S-dichloromethyl phosphorothioate
O,O-bis(2-bromoethyl) S-dichloromethyl phosphorothioate
O,O-bis(2-iodoethyl) S-dichloromethyl phosphorothioate
O,O-bis(3-chloropropyl) S-dichloromethyl phosphorothioate
O,O-bis(2-fluoroethyl) S-dichloromethyl phosphorothioate
O,O-bis(2-bromoheptyl) S-dichloromethyl phosphorothioate
O,O-bis(2-chloropropyl) S-dichloromethyl phosphorothioate Preparation of the presently provided phosphorothioates from dichloromethanesulfenyl chloride and the appropriate phosphite, i.e., the trialkyl, the tris(haloalkyl), the dialkyl haloalkyl or the alkyl bis(haloalkyl) phosphite, is conducted by simply contacting the sulfenyl chloride with the phosphite at ordinary, decreased or increased temperatures until the formation of the phosphorothioate has taken place, and recovering the phosphorothioate from the resulting reaction product. Depending upon the nature of the phosphite, the reaction is advantageously affected at temperatures of from, say, minus 20° C. to 80° C. The less reactive higher alkyl and haloalkyl phosphites will generally require heating in order to bring about the reaction, whereas use of the lower alkyl or haloalkyl phosphites permits operation at ordinary room temperature, and the reaction may be so vigorous that in order to obtain smooth condensation, external cooling is advantageously employed. When reaction has subsided, the phosphorothioate is readily obtained from the by-product alkyl halide by isolating procedures known to those skilled in the art, i.e., by distillation, solvent extraction, fractional crystallization, etc. Inasmuch as the present phosphorothioates generally have boiling points which are higher than those of either the initial reactants for the alkyl halide by-product, it usually suffices to simply distill the reaction mixture to remove such constituents, whereby the phosphorothioate product is obtained as residue.

Preparation of the present phosphorothioates from thiophosgene and the phosphite, i.e., the dialkyl, alkyl haloalkyl or bis(haloalkyl) phosphite, requires the presence of a basic catalyst. The catalyst may be organic or inorganic, e.g., it may be an organic base such as pyridine or triethanolamine, a basic salt of an organic acid such as sodium acetate or potassium stearate, or an inorganic alkali or alkaline earth metal hydroxide or a basic salt thereof such as sodium, potassium or lithium hydroxide, sodium carbonate, etc. Temperatures employed are substantially those used when preparing the phosphorothioates from dichloromethanesulfenyl chloride instead of thiophosgene, i.e., temperatures of from minus 20° C. to 80° C.

Preparation of the presently provided phosphorothioates from the appropriate phosphite and either dichloromethanesulfenyl chloride or thiophosgene may be effected in the presence or absence of an inert diluent or solvent, e.g., carbon tetrachloride, hexane or ether. The operation may be conducted at ordinary, super-atmospheric or sub-atmospheric pressure and either process may be conducted batch-wise or continuously. Since the processes involve use of one mole of the phosphite with one mole of the thiophosgene or dichloromethanesulfenyl chloride, stoichiometric proportions of these reactants are employed. However, because the phosphorothioate is easily separable from the final reaction mixture, an excess of either reactant may be used. In the thiophosgene reaction, when stoichiometric proportions of the reactants are employed and the reaction is carried to completion (which point may be determined by noting change of refractive index and/or cessation in temperature rise), the product comprises the substantially pure phosphorothioate. Purification simply involves washing out the basic catalyst.

The present phosphorothioates are stable, well-defined compounds which range from viscous liquids to waxy or crystalline solids. They may be advantageously employed for a variety of industrial and agricultural purposes, e.g., as lubricant additives, as plasticizers for synthetic resins and plastics, and as softeners for rubbery polymers. However, they are particularly valuable as biological toxicants, especially as insecticides and fungicides. In agricultural applications they demonstrate high insecticidal and fungicidal efficiency at concentrations at which no phytotoxic effect is evidenced.

The invention is further illustrated, but not limited, by the following examples:

Example 1

To 75.7 g. (0.5 mole) of dichloromethanesulfenyl chloride in 150 ml. of dichloromethane there was added, during a period of 0.45 hour with ice-cooling (2–5° C.), 83 g. (0.5 mole) of triethyl phosphite. The resulting yellow solution was then concentrated, under water-pump vacuum, to 60° C. and then distilled to give 117.8 g. (93% yield) of the crude S-dichloromethyl O,O-diethyl phosphorothioate, B.P. 80–94° C./0.1–0.5 mm. Redistillation gave the substantially pure ester, B.P. 82–83° C./0.1 mm., $n_D^{25}$ 1.4816, and analyzing as follows:

|  | Found | Calcd. for $C_5H_{11}Cl_2O_3PS$ |
|---|---|---|
| Percent C | 23.92 | 23.7 |
| Percent H | 4.41 | 4.38 |
| Percent Cl | 28.27 | 28.00 |
| Percent P | 12.20 | 12.25 |
| Percent S | 12.89 | 12.7 |

Example 2

Triethyl phosphite (49.8 g., 0.3 mole) was added, during 20 minutes, to an ice-cooled mixture of 100 ml. of hexane and 45.4 g. (0.3 mole) of dichloromethanesulfenyl chloride. The resulting orange reaction mixture was allowed to warm to 25° C. and then distilled, first at water-pump pressure to remove the hexane, and then at an oil-pump. There was thus obtained 66.4 g. of fraction, B.P. 60–97° C./0.6 mm., which upon redistillation gave 38.2 g. of the substantially pure S-dichloromethyl O,O-diethyl phosphorothioate, B.P. 85–89° C./0.6 mm.

Example 3

To 45.5 g. (0.3 mole) of ice-cooled dichloromethanesulfenyl chloride there was gradually added 54.5 g. of trimethyl phosphite. During the addition, the temperature of the reaction mixture rose to 25° C. When all of the phosphite had been added, the mixture was heated to about 75° C. at 1.5 mm. Hg pressure to remove unreacted material. There was thus obtained as residue 73.0 g. of the substantially pure S-dichloromethyl O,O-dimethyl phosphorothioate, $n_D^{25}$ 1.4893.

Example 4

To a 500 cc. flask there were added 34.5 g. (0.3 mole) of thiophosgene, 41.4 g. (0.3 mole) of freshly distilled diethyl phosphite, and 150 ml. of chloroform. The flask and its contents were cooled in ice as a solution of 12.8 g. (0.32 mole) of sodium hydroxide in 75 ml. of water was added during a period of 0.3 hour at a temperature of from 5° C. to 10° C. After stirring the whole at this temperature for 0.2 hour, it was allowed to stratify. The organic layer was separated, and the aqueous layer washed with chloroform. The combined organic layer and washings were dried over calcium chloride and distilled to give (I), 40 g. (62% yield) of an orange liquid, B.P. 90–101° C./0.2–0.3 mm. Redistillation of (I) gave (II), the substantially pure S-dichloromethyl O,O-diethyl phosphorothioate, a yellow liquid B.P. 82° C./0.1 mm., $n_D^{25}$ 1.4815, and analyzing as follows:

|  | Found | Calcd. for $C_5H_{11}Cl_2O_3PS$ |
|---|---|---|
| Percent C | 23.67 | 23.7 |
| Percent H | 4.18 | 4.38 |
| Percent Cl | 28.20 | 28.0 |
| Percent P | 12.10 | 12.25 |
| Percent S | 12.78 | 12.7 |

Example 5

To an ice-cooled mixture consisting of 58.3 g. (0.3 mole) of di-n-butyl phosphite, 34.5 g. (0.3 mole) of thiophosgene, and about 150 ml. of chloroform there was added, during a period of 0.3 hour, a solution of 12.0 g. of sodium hydroxide in 75 ml. of water. During the addition, the temperature of the reaction mixture was maintained at 7–12° C. After stirring the whole at 5–17° C. for 0.2 hour, the mixture was allowed to stratify. The chloroform layer was separated, washed with water and dried over calcium chloride for 0.5 hour. Filtration of the dried product and distillation of the filtrate to remove material boiling up to a pot temperature of 114° C./0.5 mm. gave as residue 51.1 g. of the substantially pure S-dichloromethyl O,O-di-n-butyl phosphorothioate.

Example 6

In an ice-cooled flask there was placed 76.5 g. (0.284 mole) of tris(2-chloroethyl) phosphite, and 43 g. (0.284 mole) of dichloromethanesulfenyl chloride was added thereto during 0.3 hour, with stirring and cooling (5–15° C.). When all of the chloride had been added, the reaction mixture was concentrated to a pot temperature of 78° C./0.3 mm., whereby by-product 1,2-dichloroethane as well as any unreacted material distilled off. The residue (86.0 g., 94% theoretical yield) was the substantially pure O,O-bis(2-chloroethyl) S-dichloromethyl phosphorothioate, a light yellow liquid, $n_D^{25}$ 1.5166.

Example 7

This example describes insecticidal testing of the S-dichloromethyl O,O-diethyl phosphorothioate of Example 2.

An emulsion of the phosphorothioate was prepared by adding a cyclohexanone solution thereof and an emulsifying agent to water to give an emulsion containing 0.05% of the test chemical. The emulsifier was a mixture of a higher alkyl benzenesulfonate and a polyalkylene glycol known to the trade as "Emulsifier L," and it was used in a quantity of 0.2% by weight based on the weight of the total emulsion. Potted bean plants were respectively sprayed to run-off with the emulsion. Immediately after the spray residue was dry, 10 bean beetle larvae were transferred to leaves excised from the sprayed plants. The infested leaves were then held 2 days for observation. At the end of that time, inspection of the infested leaves and the sprayed plants showed a 100% kill of the bean beetle larvae and no phytotoxic effect. Observation of "controls," i.e., similarly infested plants which had been sprayed with an emulsion consisting only of water and the same quantity of cyclohexanone and "Emulsifier L," showed the larvae to be not at all affected.

Example 8

The S-dichloromethyl O,O-diethyl phosphorothioate was tested as an insecticide against the yellow fever mosquito, Aedes aegypti (Linne'), using the following procedure:

Duplicate culture tubes were filled with 70 cc. of distilled water, and to the water there was then added a quantity of an acetone solution of said phosphorothioate to give an 0.00013% (1.3 p.p.m.) concentration of test chemical in each tube. Approximately 25 mosquito larvae were then transferred into each of said tubes. A duplicate set of "controls" was also prepared by adding 25 larvae to each of two tubes which contained distilled water and the same quantity of acetone, but no test compound. The tubes were than held at room temperature for 24 hours. Observation at the end of that time showed a 100% kill of larvae in both of the tubes which contained the 0.00013% concentration of the S-dichloromethyl O,O-diethyl phosphorothioate and zero kill of the larvae in the "control."

Example 9

The S-dichloromethyl O,O-dimethyl phosphorothioate of Example 3 was tested at an 0.1% concentration against bean beetle larvae, using the test method described in Example 7. A 100% kill of the larvae was obtained.

Example 10

This example describes testing of S-dichloromethyl O,O-diethyl phosphorothioate against the fungi Stemphyllium sarcinaeforme and Monilinia fructicola. The following procedure was employed:

Spore suspensions of the test organisms were respectively prepared from 5-day old cultures thereof on slants of agar culture medium by removing said spores from the slants and suspending them in distilled water. The concentration of spores was adjusted to about 40,000 per ml. of water.

The phosphorothioate was added to distilled water in a concentration calculated to give 1,000 parts of the compound per million parts of water. An 0.01 ml. aliquot of the resulting mixture was pipetted, respectively, into wells (duplicates for each test organism) of a depressed glass slide and allowed to evaporate to dryness. Then an 0.1 ml. aliquot of one of the spore suspensions was pipetted into each well. The concentration of said phosphorothioate in each well was thus lowered to 100 parts per million. Duplicate "controls" for each test organism were also prepared by pipetting respectively 0.1 ml. aliquots of said spore suspensions into empty wells of a depressed glass slide. All of the slides were then incubated in a moist chamber for 16 hours at 25° C. Inspection of the slides at the end of this time showed complete inhibition of both of said test organisms in the presence of the phosphorothioate, i.e., on all of the slides in which the S-dichloromethyl O,O-diethyl phosphorothioate had been deposited, whereas there was profuse germination of both organisms in all of the "control" slides.

The present phosphorothioates are generally incorporated into inert carriers when employed as biological toxicants, since they are active in very small concentrations. They are preferably applied by spraying aqueous suspensions or oil-in-water emulsions of the same, this method affording an easy and inexpensive way of, e.g., destroying insects and inhibiting microorganisms such as bacteria and fungi. Dispersing or emulsifying agents are advantageously employed in the presence of suspensions or emulsions designed for use as agricultural pesticides. However, the present phosphorothioates are likewise effective when applied in agricultural dusts, i.e., compositions in which the carrier is, e.g., talc, pumice or bentonite.

What I claim is:

1. A phosphorothioate of the formula

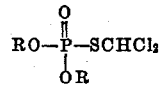

in which R is selected from the class consisting of alkyl and haloalkyl radicals of from 1 to 8 carbon atoms.

2. An O,O-dialkyl S-dichloromethyl phosphorothioate having from 1 to 8 carbon atoms in the alkyl radical.

3. An O,O-bis(haloalkyl) S-dichloromethyl phosphorothioate having from 1 to 8 carbon atoms in the haloalkyl radical.

4. S-dichloromethyl diethyl phosphorothioate.

5. S-dichloromethyl dimethyl phosphorothioate.

6. O,O-di-n-butyl S-dichloromethyl phosphorothioate.

7. O,O-bis(2 - chloroethyl) S-dichloromethyl phosphorothioate.

8. The method which comprises contacting thiophosgene, in the presence of a basic catalyst, with a phosphite of the formula HO—P(OR)$_2$ in which R is selected from the class consisting of alkyl and haloalkyl radicals of from 1 to 8 carbon atoms, and recovering from the resulting reaction product a phosphorothioate of the formula $$RO-\underset{\underset{OR}{|}}{\overset{\overset{O}{\|}}{P}}-SCHCl_2$$

in which R is as herein defined.

9. A composition effective against insects and fungi which comprises an inert carrier and as the essential effective ingredient a phosphorothioate of the formula $$RO-\underset{\underset{OR}{|}}{\overset{\overset{O}{\|}}{P}}-SCHCl_2$$

in which R is selected from the class consisting of alkyl and haloalkyl radicals of from 1 to 8 carbon atoms.

10. An insecticidal composition which comprises an inert carrier and as the essential effective ingredient a phosphorothioate of the formula $$RO-\underset{\underset{OR}{|}}{\overset{\overset{O}{\|}}{P}}-SCHCl_2$$

in which R is selected from the class consisting of alkyl and haloalkyl radicals of from 1 to 8 carbon atoms.

11. An insecticidal composition comprising an inert carrier and S-dichloromethyl O,O-diethyl phosphorothioate as the essential effective ingredient.

12. A fungistatic composition which comprises an inert carrier and S-dichloromethyl O,O-diethyl phosphorothioate as the essential effective ingredient.

13. The method of combatting an organism selected from the class consisting of insect pests and fungi which comprises exposing said organism to a toxic quantity of a phosphorothioate of the formula $$RO-\underset{\underset{OR}{|}}{\overset{\overset{O}{\|}}{P}}-SCHCl_2$$

in which R is selected from the class consisting of alkyl and haloalkyl radicals of from 1 to 8 carbon atoms.

14. The method of destroying insect pests which comprises exposing the pests to a toxic quantity of S-dichloromethyl O,O-diethyl phosphorothioate.

15. The method of inhibiting the growth of fungi which comprises exposing the fungi to a toxic quantity of S-dichloromethyl O,O-diethyl phosphorothioate.

16. The method which comprises contacting thiophosgene with diethyl phosphite in the presence of a basic catalyst and recovering S-dichloromethyl O,O-diethyl phosphorothioate from the resulting reaction product.

17. The method which comprises contacting thiophosgene with di-n-butyl phosphite in the presence of a basic catalyst and recovering S-dichloromethyl O,O-di-n-butyl phosphorothioate from the resulting reaction product.

References Cited in the file of this patent

UNITED STATES PATENTS

| 2,680,451 | Gilbert et al. | Sept. 28, 1954 |
| 2,811,543 | Coover et al. | Oct. 29, 1957 |

FOREIGN PATENTS

| 1,069,431 | France | Feb. 10, 1954 |

OTHER REFERENCES

Morrison: J. Am. Chem. Soc. 77, pp. 181–2 (1955).